United States Patent [19]

Takenoya et al.

[11] Patent Number: 4,920,902
[45] Date of Patent: May 1, 1990

[54] AUTOMATIC PATTERN SEWING MACHINE

[75] Inventors: Hideaki Takenoya; Reishi Nomoto; Yoshikazu Ebata, all of Tokyo, Japan

[73] Assignee: Janome Sewing Machine Co. Ltd., Tokyo, Japan

[21] Appl. No.: 198,455

[22] Filed: May 25, 1988.

[30] Foreign Application Priority Data

Jun. 5, 1987 [JP] Japan .............................. 62-86649[U]

[51] Int. Cl.⁵ .......................... D05C 9/06; D05B 21/00
[52] U.S. Cl. ................................ 112/103; 112/121.12
[58] Field of Search ............. 112/103, 121.12, 121.11, 112/102, 78, 84, 98, 99, 100, 101, 266.1, 262.3

[56] References Cited

U.S. PATENT DOCUMENTS 4,365,565 12/1982 Kawai et al. .................. 112/103
4,385,570  5/1983 Yanagi ......................... 112/121.12
4,742,786  5/1988 Hashimoto et al. ............. 112/103 X Primary Examiner—Peter Nerbun
Attorney, Agent, or Firm—Michael J. Striker

[57] ABSTRACT

An automatic pattern sewing machine includes a memory for storing blocks of data for controlling the sewing of an applique piece on a base cloth. A separate sheet of paper is printed with a set of patterns corresponding to different sizes of an applique pattern of one type and with corresponding identification marks. The applique piece is prepared in conformity with the printed pattern of the selected size and the assigned printed identification mark is entered into the machine by a selecting key to activate a coordinate transforming means which adjust the stored data to the selected size of the pattern. The applique piece is then stitched along its perimeter onto the base cloth according to the adjusted information.

6 Claims, 3 Drawing Sheets

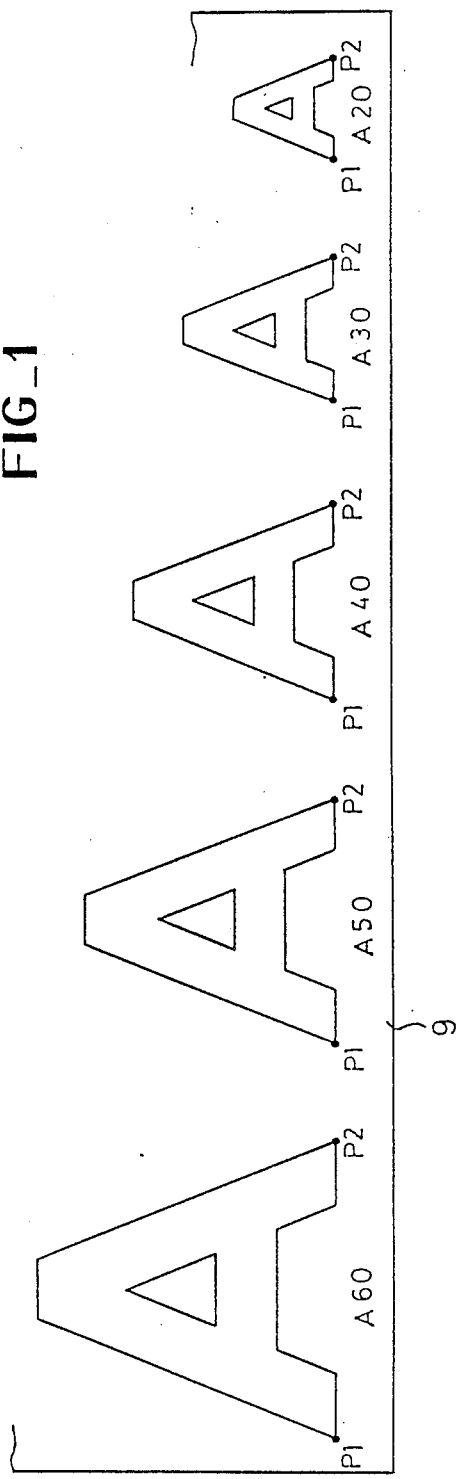
FIG_1
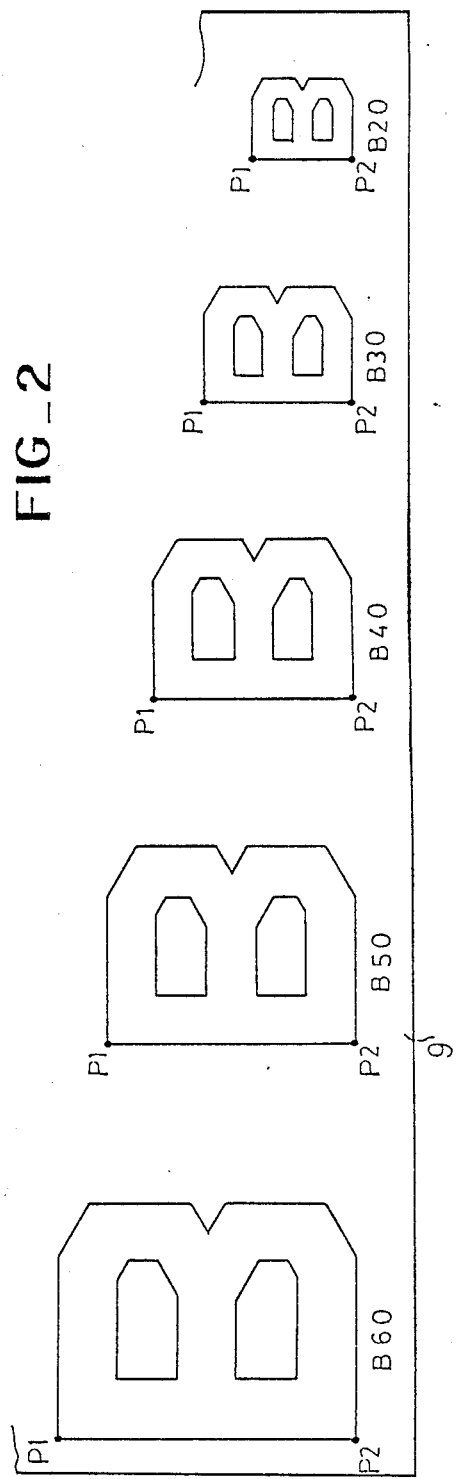
FIG_2

FIG_3
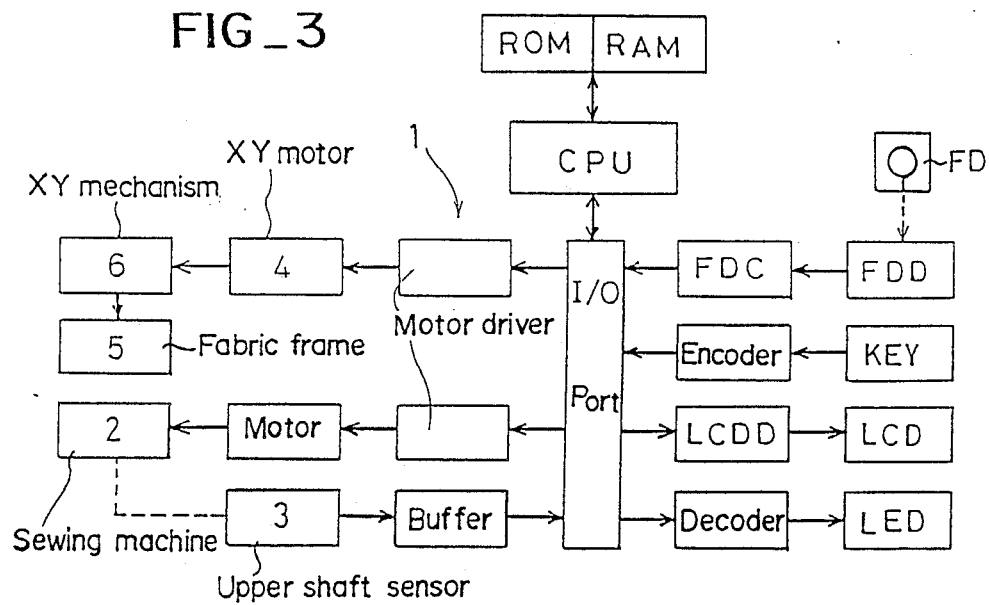
FIG_4
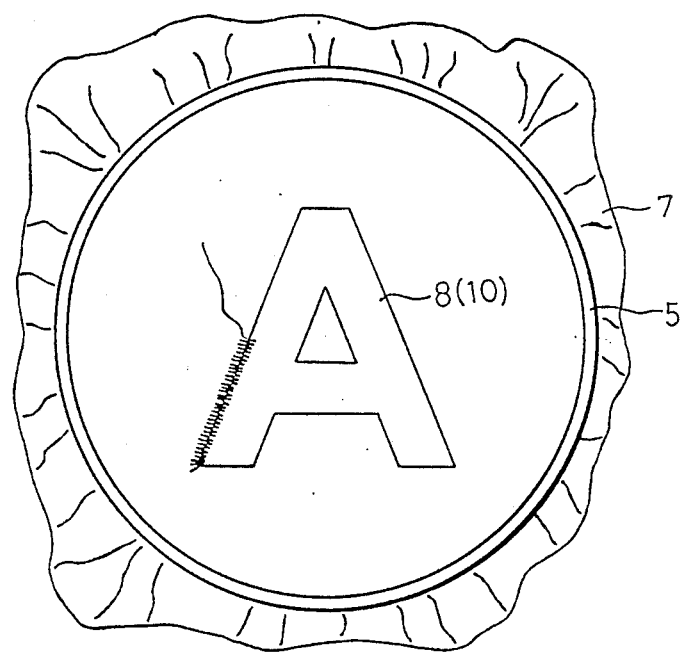

FIG_5
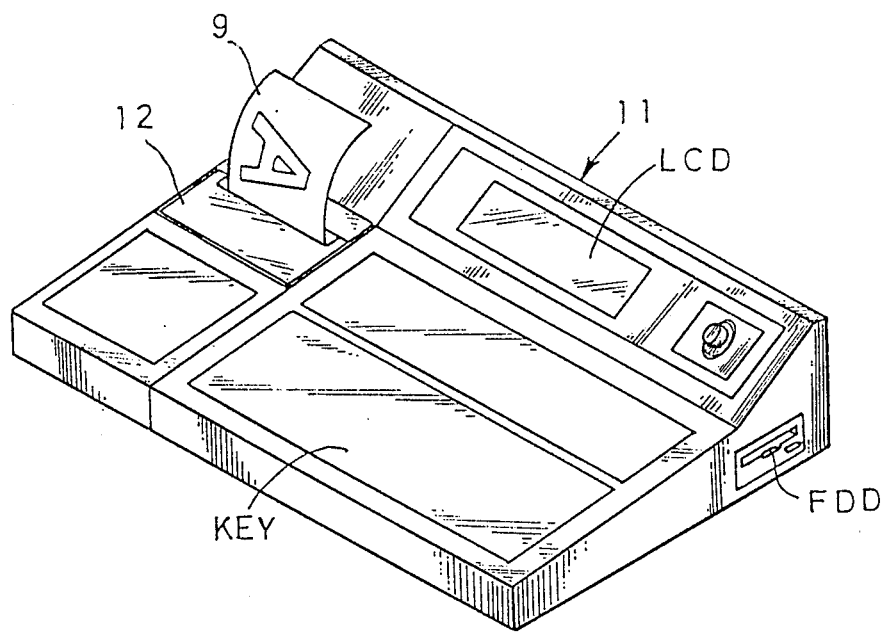

AUTOMATIC PATTERN SEWING MACHINE

BACKGROUND OF THE INVENTION

The present invention relates to an automatic pattern sewing machine, and more particularly to an automatic pattern sewing machine which is so constructed that appliqué work can be automatically performed promptly and accurately.

Heretofore, a method of appliqué work with a sewing machine has been such that base cloth is manually moved along the contours of an appliqué piece stuck to the base cloth and that the contours of the appliqué piece are sewn on by zigzag sewing of small pitches.

This method has the problem that, when the external shape of the appliqué work is complicated, a high degree of skill is required for promptly and accurately performing the appliqué work, so the range of application of the method is chiefly limited to hobby fields.

Another method of appliqué work with a sewing machine has been such that the shape, size etc. of the appliqué work are first determined, that needle dropping data blocks defining the shape, size, etc. are generated on each occasion, and that the appliqué work is executed according to the data blocks.

This method is suited to repeatedly perform the appliqué work of the same shape, size etc., but it has the problem that labor and time are expended when performing many kinds of appliqué work.

Another problem of this method is as follows: In case of performing the appliqué work, unless a measure of controlling the sewing machine in accordance with the position and inclination of an appliqué piece on the base cloth is taken, the base cloth to which the appliqué piece has been secured needs to be precisely positioned to and set on a cloth frame. Labor and time are expended on the positioning operation.

SUMMARY OF THE INVENTION

An object of the present invention is to solve the problems of the prior-art methods as mentioned above and to provide an automatic pattern sewing machine for appliqué work.

According to the present invention, an automatic pattern sewing machine is so constructed that a plurality of blocks of pattern data for sewing appliqué pieces on base cloth pieces are written in a built-in memory device beforehand or are written from an external storage medium into the memory device, and that webs or sheets or paper patterns designated with a coded information for selecting and preparing appliqué pieces to be used in the appliqué ing operations, are supplied to a user of the sewing machine. The prepared appliqué pieces are sewn along their perimeters onto a base cloth piece according to information contained on the paper sheets and in the pattern data blocks. Thus, many kinds of appliqué work can be performed promptly and accurately.

Moreover, a plurality of indicative points of each paper pattern are designated on each sheet of the paper patterns, and data defining needle dropping positions and or positions of an indicating tool and/or a position and inclination of the appliqué piece on the base cloth are input into the memory device in conformity with the plurality of indicative points on the appliqué piece, whereby the employed pattern data block is subjected to coordinate transformation, and the appliqué ing operation is executed according to the position and inclination of the appliqué piece. Therefore, the laborious positioning of the base cloth with the appliqué piece to a cloth frame as has hitherto been required is dispensed with, and the appliqué work with the sewing machine can be quickly executed.

BRIEF DESCRIPTION OF THE DRAWINGS

The drawings illustrate embodiments of the present invention, wherein:

FIGS. 1 and 2 are partial views each showing an example of a sheet of paper patterns;

FIG. 3 is a block diagram showing the schematic arrangement of an automatic pattern sewing machine;

FIG. 4 is a plan view showing the process of appliqué work; and

FIG. 5 is a perspective view showing the control unit of an automatic pattern sewing machine which is furnished with a printer for printing a paper pattern.

DESCRIPTION OF THE PREFERRED EMBODIMENTS OF THE INVENTION

In an automatic pattern sewing machine which sews automatically on the basis of pattern data fetched from a memory device built in the machine, the present invention replaces the known system wherein the pattern data for appliqué work is generated according to the shape and size of an appliqué piece on each occasion, with a construction in which a plurality of block of pattern data for a plurality of kinds of appliqué work are generated beforehand and stored in a memory device, and in which paper sheets with patterns corresponding to appliqué patterns to be sewn on the basis of the pattern data blocks are generated and supplied to the user of the automatic pattern sewing machine. According to the construction of the present invention, many kinds of appliqué work can be performed promptly and accurately.

There are two systems for storing and fetching the pattern data. In the first system, the blocks of pattern data are stored in the built-in memory device beforehand, and from the stored plurality of the pattern data blocks, a desired one is selected and fetched. In the second system, the blocks of pattern data are stored in an external storage medium, and from the stored pattern data blocks, a necessary one is selected and written into the plurality of memory device of the built-in sewing machine, from which it is thereafter readout.

In an embodiment to be described below, the second system will be taken as an example.

Referring now to FIG. 3, the schematic arrangement of an automatic pattern sewing machine according to the embodiment of the present invention will be described. As illustrated in the figure, the automatic pattern sewing machine 1 comprises a sewing machine proper 2 which forms final-sewing stitches, an X-Y motor 4 which is controlled in X- and Y-directions in synchronism with signals from the upper-shaft sensor 3 of the sewing machine proper 2, and an X-Y mechanism 6 which is driven by the X-Y motor 4 so as to control a cloth frame 5 in the X- and Y-directions.

In addition, pattern data for contour sewing (ground sewing) on base cloth (7 in FIG. 4) previous to appliqué work is stored in a floppy disk FD which serves as an external storage medium. When the user of the sewing machine 1 inserts the floppy disk FD into a floppy disk drive FDD and selects a letter, a design or the like for the appliqué work through the manipulation of a keyboard KEY, the corresponding pattern data of the floppy disk FD is loaded in a temporary memory device RAM. The size of the appliqué work is set on the keyboard KEY, a sewing position on the base cloth 7 is adjusted with a shift key (not shown), and a start button (not shown) is depressed for the first time. Then, the X-Y motor 4 is controlled in synchronism with the signal from the upper-shaft sensor 3 as produced every revolution of the sewing machine proper 2, and the contour sewing is performed on the base cloth 7 attached to the cloth frame 5. In parallel with the contour sewing, the pattern data is expanded into needle dropping data for every stitch of the appliqué work.

After the contour sewing, an appliqué piece 8 (FIG. 4) prepared according to a sheet 9 of paper patterns (FIG. 1 or FIG. 2) is stuck on the base cloth in conformity with the sewn contour, and the start button is depressed secondly. Then, the appliqué piece 8 is sewn on the base cloth 7 in accordance with the dropping data for every stitch, whereby the appliqué work is performed.

A plurality of blocks of pattern data for the letters, designs etc. of mutually different kinds of appliqué work are stored in the floppy disk FD under the condition that each pattern data block affords a standard size. When, on the keyboard KEY, one of the pattern data blocks is selected and a desired size from a plurality of predetermined sizes is set, the selected pattern data block is converted into a pattern data block conforming to the set size.

In the present embodiment, the webs or sheets of paper patterns 9 for generating the appliqué pieces for use in the appliqué work are prepared beforehand and supplied to the user. As exemplified in FIGS. 1 and 2, the sheets of paper patterns 9 are such that different kinds of letters, designs etc. each having a plurality of predetermined sizes are prepared, and appliqué pieces in the plurality of predetermined sizes can be generated for each of the letters, designs etc.

Now, the steps of appliqué work will be described.

In preparing the base cloth 7 for an applicable work, the base cloth is first fixed to the cloth frame 5, and the sewing-machine proper 2 is made ready to sew. Subsequently, a pattern for the appliqué work is chosen from an appliqué pattern code table, and the keyboard KEY is manipulated to select a block of pattern data corresponding to the chosen appliqué pattern and to set the size of the appliqué pattern.

Next, when the start button is depressed to start sewing, the sewing of the contour of the appliqué piece is carried out in the set size on the base cloth by straight stitching. During the contour sewing, the pattern data block is converted into a block of needle dropping data for later appliqué stitching.

Subsequently, a prepared appliqué piece 8 (10) is stuck on the base cloth 7 according to the sewn contour ground sewing.

The appliqué piece 8 (10) is prepared in such a way that the paper pattern corresponding to the appliqué pattern and size as selected is chosen from among patterns with the indications (A60, A50, ..., B60, B50, ...) of pattern Nos. and sizes and is stuck to a piece of applique cloth 10, whereupon the cloth 10 is cut along the contour of the stuck paper pattern to prepare the appliqué piece 8 (10).

When the start button is depressed after sticking the appliqué piece 8 (10) to the base cloth 7, the appliqué stitching is started. As shown in FIG. 4, the appliqué piece 8 (10) is automatically sewn along its perimeter or contour, and this contour and other necessary points are stitched up on the base cloth 7. Then, the appliqué work ends.

The above process for the appliqué work includes the step of sticking the appliqué piece 8 (10) to the base cloth 7 in accordance with the contour sewing. It is also possible, however, to perform the appliqué work without the preliminary contour sewing.

To this end, a plurality of indicative points (P1, P2) are added to each paper pattern of the paper pattern sheets 9 apart form the marks indicating pattern Nos. and sizes (A60, A50, ..., B60, B50, ...) as shown in FIGS. 1 and 2.

In this system, the contour sewing for the appliqué work can be omitted as will be explained below.

In performing the appliqué work, as in the foregoing, the base cloth 7 is fixed to the cloth frame 5 and the sewing-machine proper 2 is made ready to sew as the first step, and an appliqué pattern is selected and the size thereof is set as the second step. Thereafter, the appliqué piece 8 (10) is stuck to the base cloth 7. Further, needle dropping positions or the positions of an indicating tool are input in conformity with a plurality of points on the appliqué piece 8 corresponding to the plurality of indicative points (P1, P2, ...), thereby entering the data blocks defining the position and inclination of the appliqué piece on the base cloth. Then, the block of pattern data is subjected to coordinate transformation, and the appliqué stitching is carried out in accordance with the position and inclination of the appliqué piece 8.

As thus far described, according to the present invention, the laborious positioning of the base cloth with the appliqué piece to the cloth frame as has hitherto been required is dispensed with, so that the appliqué work with the sewing machine can be quickly executed.

The foregoing system in which the sheets of paper patterns are prepared beforehand and are supplied to the user of the sewing machine, can be replaced with another system embodiment to be explained below.

That is, a paper pattern is printed in a printer and supplied during the step of selecting an appliqué pattern.

More specifically, the control unit 11 of an automatic pattern sewing machine shown in FIG. 5 is equipped with a printer 12. A floppy disk FD is inserted into a floppy disk drive FDD, and a keyboard KEY is manipulated to select the appliqué pattern and to set the size thereof. When a print button (not shown) for the printer 12 is thereafter depressed, the paper pattern corresponding to the basis of the selected block of pattern data is printed on a sheet 9 and discharged from the printer.

An appliqué piece 8 (10) is prepred with the paper pattern sheet 9 and an applique cloth 10, and applique stitching can be carried out using the prepared appliqué piece in the same manner as described before in connection with FIG. 4. Further, when indicative points (P1, P2, ...) are simultaneously printed on the paper pattern sheet 9, the appliqué work can be performed without ground sewing as in the foregoing case.

As described above, the present invention brings forth the effect that many kinds of appliqué work can be performed promptly and accurately. Another effect is that the laborious positioning of a base cloth with an appliqué piece to a cloth frame as has hitherto been required is dispensed with, so that appliqué work with a sewing machine can be quickly executed to.

What is claimed is:

1. An automatic pattern sewing machine having a unit for controlling the stitching of an applique patten on a base cloth, comprising a memory for storing blocks of data assigned to different types of applique patterns; at least one sheet carrying a set of printed patterns corresponding to predetermined different sizes of an applique pattern of one of the types stored in the memory, and printed size identifying marks assigned to respective printed patterns; a plurality of keys each being assigned to an identifying mark, said keys being selectively operated in reference to said patterned sheet to select a block of data pertaining to said applique pattern of a desired size; first coordinate transforming means operated in response to the actuation of the selected key to convert said block of applique pattern data into first coordinates defining a stitch contour of the selected size of said applique pattern; second coordinate transforming means operated in response to the actual formation of said stitch contour in said first coordinates on the base cloth to convert said block of applique pattern data into second coordinates defining the stitches for the selected size of said applique pattern; and means for stitching onto the base cloth an applique pattern piece which conforms with the selected printed pattern and is positioned onto the area of the base cloth delimited by the contour stitched in said first coordinates.

2. An automatic pattern sewing machine having a unit for controlling the stitching of an applique pattern on a base cloth, comprising a memory for storing blocks of data assigned to different types of applique patterns; at least one sheet carrying a set of printed patterns corresponding to predetermined different sizes of an applique pattern of one of the types stored in the memory, and printed size identifying marks and point marks assigned to respective printed patterns; a plurality of keys each being assigned to an identifying mark, said keys being selectively operated in reference to said patterned sheet to select a block of data pertaining to said applique pattern of a desired size; an input key operated each time when a machine needle penetrates predetermined points of an applique pattern piece prepared in accordance with the selected printed pattern and placed on the base cloth, said plurality of predetermined points corresponding to said printed point marks of the patterned sheet; and coordinate transforming means operated in response to said needle penetrating operations to convert said block of applique pattern data into coordinates defining the stitching of said applique pattern piece onto the base cloth.

3. An automatic pattern sewing machine as defined in claim 1 wherein said memory is a built-in RAM for storing a block of data assigned to an applique pattern of one type, and further comprising an external memory for storing blocks of data assigned to at least one type of applique pattern of different sizes; a data reader operated in response to the actuation of one of said keys to read out the data of a selected applique pattern of a desired size from said external memory and write the same into said built-in RAM memory; a printer including control means operated in response to the actuation of an additional key to control said printer according to said data of a selected applique pattern stored in the built-in RAM memory to print out the selected size of the applique pattern on said sheet.

4. An automatic pattern sewing machine as defined in claim 3, wherein said external memory is a floppy disk and said data reader is a floppy disk drive.

5. An automatic pattern sewing machine as defined in claim 2 wherein said memory is a built-in RAM for storing a block of data assigned to an applique pattern of one type, and further comprising an external memory for storing blocks of data assigned to at least one type of applique pattern of different sizes; a data reader operated in response to the actuation of one of said keys to read out the data of a selected applique pattern of a desired size from said external memory and write the same into said built-in RAM memory; a printer including control means operated in response to the actuation of an additional key to control said printer according to said data of a selected applique pattern stored in the built-in RAM memory to print out the selected size of the applique pattern on said sheet.

6. An automatic pattern sewing machine as defined in claim 5, wherein said external memory is a floppy disk and said data reader is a floppy disk drive.

* * * * *